Patented Mar. 16, 1937

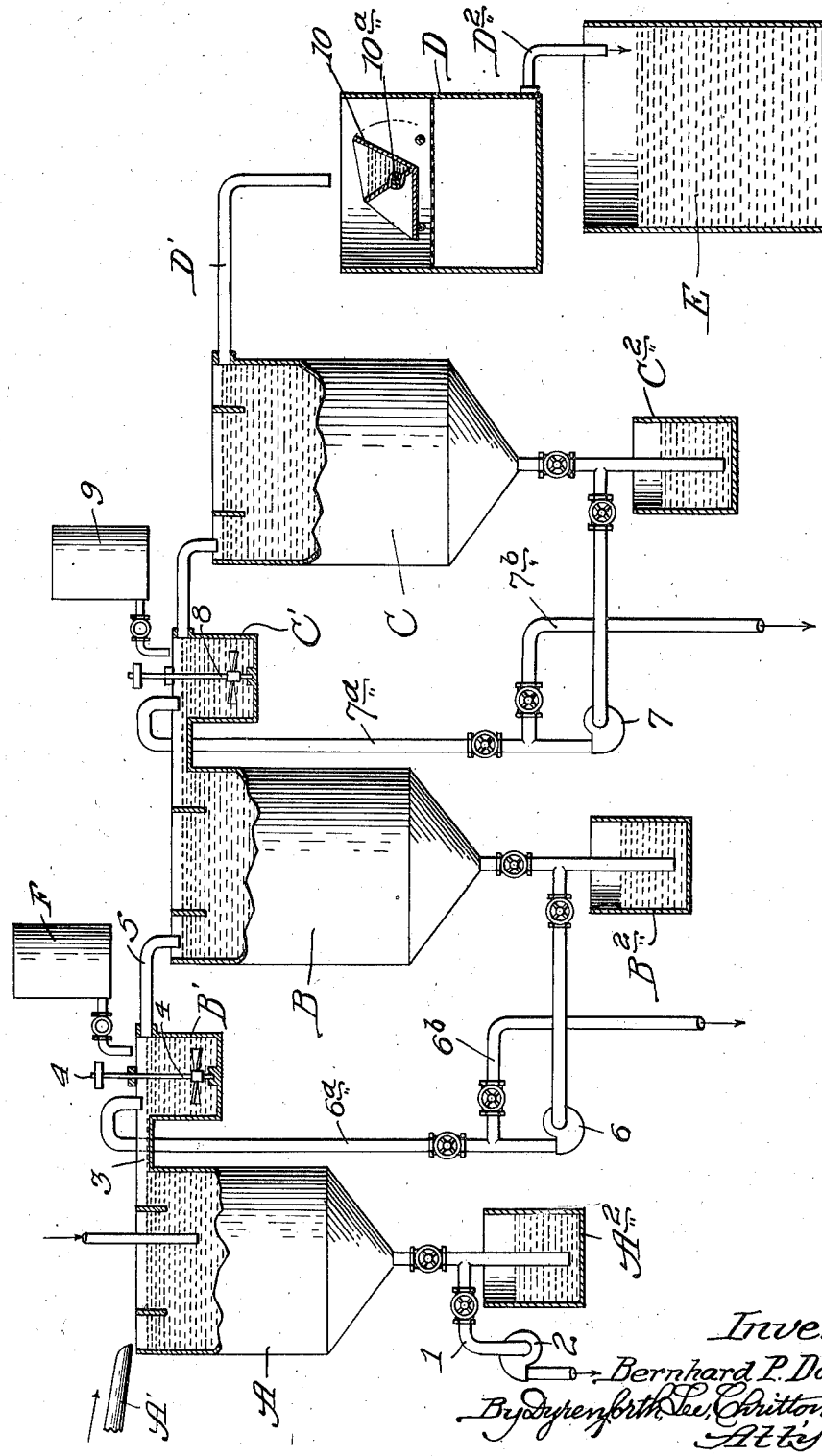

2,074,082

UNITED STATES PATENT OFFICE 2,074,082

SEWAGE TREATING PROCESS

Bernhard P. Domogalla, Madison, Wis.

Application February 9, 1935, Serial No. 5,816

12 Claims. (Cl. 210—2)

This invention pertains particularly to the purification, or partial purification, of sewage. It is applicable, with great advantage, to the substantially complete purification (or the partial purification, if desired) of sewage carrying very high percentages of impurities, such as sewage from meat packing plants, tanneries, paper mills, canneries, textile factories, distilleries, etc. It may, however, be used to complete the treatment of waste waters from such sources, where incomplete treatment has been given previously, so that the final effluent can be safely run into lakes or rivers. The process is applicable, also, to the treatment of any domestic sewage waters; and it may be used for the purification and clarification of drinking waters, lakes, streams, etc.

Where the waste waters from a meat packing plant are of such character that they cannot be sent, as a whole, to a municipal sewage-treating plant, it is possible to divide the sewage and route the portions in such manner that the lighter, or less contaminated, portion may go to a municipal treating plant, while the heavier portion, that is, the portion containing a very high percentage of impurities, will be subjected to pre-treatment in accordance with the present invention, after which the pre-treated portion may also be sent to a municipal sewage treating plant. It has been found, for example, that in some locations, where municipal treating plants are available, packing house sewage may be divided so that, roughly, about ⅔ of the sewage can be sent directly to the municipal sewage treating plant which is prepared to treat sewage of such character, while the other portion, roughly ⅓, containing a very high percentage of impurities, may be pre-treated in accordance with the present process and then sent to the municipal treating plant.

On the other hand, the sewage from a packing plant, or other industrial plant, may be subjected to all of the successive treating steps hereinafter described, in which case the final fluid will be so free from impurities that the waters may be run, with perfect safety, into lakes or rivers. In fact, it is easily possible to render the final fluid of such high purity that it may be safely used as drinking water.

Where a division of the sewage waters from a packing plant, for example, is resorted to, as suggested above, the ⅓ portion would contain a very high percentage of impurities, in the form of blood, grease, particles of flesh and other tissues, ash, and nitrogen, in the form of ammonia and in the form of organic nitrogen. Where such heavily impure sewage is to be treated, it is desirable to subject the sewage to a preliminary settling operation to remove such solids as will readily drop out of suspension. A small amount of chlorine gas, or other germicidal substance, may be introduced into the preliminary settling tank for the purpose of holding in check the micro-organisms which might otherwise operate to cause putrescence, or create disagreeable odors. In the preliminary settling tank, or later in the process, a skimming process may be resorted to for the purpose of removing some of the surface fats.

The accompanying drawing illustrates, diagrammatically, apparatus adapted to the practice of the improved process, as applied to substantially complete purification of sewage of the heavy-impurity type, and the improved process will be described in connection with the diagram shown in the drawing, after which modifications will be mentioned.

In the drawing, A designates a preliminary settling tank which receives its supply from a trough, or weir, A', and the settlings of which may be discharged into an auxiliary tank or sump $A^2$; B, a coagulum-settling tank which receives its supply from a mixing tank B', which, in turn, receives the overflow sewage from the tank A, coagulum from the tank B being discharged into an auxiliary tank, or sump $B^2$; C, a second coagulum-settling tank which receives its supply from a mixing tank C', which, in turn, receives the overflow sewage from the tank B, the settlings from the tank C being dischargeable into an auxiliary tank or sump $C^2$; and D, a filter tank which receives its supply from an overflow pipe D' with which the tank C is equipped, the effluent from the tank D, in the form of highly purified water, passing through the pipe $D^2$ to any point of disposal, as, for example, into a tank E, from which the water may run or be pumped to any desired point.

The sludge from the auxiliary tank $A^2$ may be withdrawn through a pipe 1 fitted with a pump 2. The sludge may be disposed of in any desired manner. It may be treated and used for fertilizer, if desired; or it may be incinerated.

The effluent from the tank A escapes through a passage 3 into the mixing tank B', where it is mixed with chemicals which produce certain chemical reactions and act as coagulants. It is preferred to introduce into the tank B' zinc chloride as a principal coagulant and alum as an auxiliary coagulant, these materials being taken preferably in the proportion of about one part of zinc chloride to two parts of alum. Other substances, for example, clay, may be introduced into the mixer B', to aid in effecting the settling of the solids which enter the mixing tank with the sewage, and the coagulum, or precipitates, which may be formed by chemical reactions within the mixing tank. The tank F indicates a container for chemicals which may be admitted, in desired proportions, to the mixing tank B'. Where chemicals which will react upon each other are to be used in the tank B', they preferably are introduced separately, so that the reaction will occur in the mixing tank in the presence of the impurities in the sewage.

The tank B' is shown fitted with a stirrer 4, and it will be understood that mixing is carried on until a satisfactory mixture is secured and opportunity for reaction is given. The effluent from the tank B' overflows through a pipe 5 to tank B; and in the tank B the solids and coagulum are given opportunity to settle. Ordinarily, a period of from ½ hour to one and one-half hours will suffice.

The settlings from the tank B, which may be discharged into the auxiliary tank B², may be re-circulated, if desired. Thus a pump 6 will serve to return the settlings through a pipe 6ᵃ to the mixing tank B'. When desired, the settlings may be discharged from the system through a branch pipe 6ᵇ. These settlings may be treated and used for fertilizer. If desired, they may be incinerated, and the ash may be introduced into the mixing tank B'.

As a principal floc-former, the salts of zinc and inorganic acids are preferred. Of these, zinc chloride is highly satisfactory, and zinc sulphate may be used as a second preference.

For treating the highly impure portion of packing house sewage mentioned above, the best chemical solution, from the standpoint of a principal coagulant and a coagulant aid, used combinedly, has been found to be about 10 grains of zinc chloride and 20 grains of commercial alum per gallon of concentrated waste waters. Such a combination produces a hydrogen-ion concentration of from 5.0 to 7.0, giving best results at about 6.2. The use of zinc chloride alone in connection with an almost neutral waste water of the character mentioned will produce a menstruum of about pH 6.5. Treatment of sewage in a packing plant on a rather large scale has shown the effectiveness of using a slightly acid menstruum, preferably about pH 6.2, in treating the sewage with zinc chloride, and, if desired, a subsidiary substance, such as alum.

Coagulant "aids" which are serviceable may be listed in the order of preference, as follows:

1. Salts of aluminum, such as the alums, aluminum chloride, etc.
2. Free tannic acid, or salts thereof, or substances which yield tannic acid, tannins, oak bark extract, etc.
3. Salts of iron, such as ferrous sulphate, ferric sulphate, or ferric chloride.
4. Salts of copper, such as copper sulphate, or copper chloride.
5. Mineral acids, such as sulphuric, hydrochloric, or arsenious.
6. Caustic alkalis, alkaline earth metal salts, or the like, such as caustic soda, or quicklime.

It may be noted here, however, that where full treatment is to be given in accordance with the preferred process, alkalis are not introduced into the first flocculator unless for the purpose of maintaining a desired pH.

It is possible, of course, to use one or more of the coagulant "aids" in combination with a zinc salt in the first floc-producing treatment.

Where a less concentrated sewage is to be treated percentages of zinc chloride and alum may be reduced. For a sewage of medium impurities, for example, 5 grains of zinc chloride and 10 grains of alum per gallon of sewage will serve. For a still less concentrated sewage, the chemicals may be reduced still further, say to as low as 3 grains zinc and 6 grains alum per gallon. It will rarely be necessary to go above 10 grains zinc chloride or 20 grains alum per gallon, but for an extremely high concentration sewage an upper limit of 15 grains of zinc chloride and 30 grains of alum may be used. It is to be noted, however, that if the chemicals are used somewhat in excess of necessity, no evil effects will result therefrom. The purpose, of course, is to use the chemicals in proper proportion to flocculate the protein and other nitrogenous materials, the fats, soaps, greases, and other organic materials, and also the phosphate material. The floc thus produced is permitted to settle in the tank B, while the overflow is treated in the mixer C' and the second flocculator C.

After clarification has been carried as far as is practicable in the tank B, it is preferred to mix with the effluent in the mixer C' about 40 grains of fresh lime per gallon of waste water introduced into the mixer. A hydrogen-ion concentration of about 9 to 11 in the mixer C' has been found to be the best alkalinity range, dealing with concentrated packing house sewage, after the latter has been treated in the mixer B' and settling tank B. Caustic alkalis can be used in place of alkaline earth salts; and the degree of flocculation and clarification can be increased by introducing into the mixer C' coagulant "aids" such as salts of iron, copper, or tannic acid. If desired, settlings from the tank C may be re-circulated. Thus, a pump 7 may serve to return sludge from the auxiliary tank C² through a pipe 7ᵃ to the mixer C'. When desired, sludge may be withdrawn through the pipe 7ᵇ. This sludge may be treated and used as a fertilizer, or it may be incinerated, and ash may be returned to the mixer C'. The mixer C' is shown equipped with a stirrer 8 and a chemical supply tank 9. Any suitable means may be employed for introducing chemicals, however.

Sufficient time is allowed for proper settling in the tank C. Ordinarily, from one-half hour to one and one-half hours will suffice. The effluent may pass from the tank C through the pipe D' to a sewer (not shown); or, the effluent may pass into the filter D, in cases where a still higher degree of purity is desired. In certain packing plants, some of the departmental wastes contain small amounts of sugar in solution, as for example, where sugar-cured hams are produced. Organic substances remaining in solution in the effluent which passes through the pipe D', which would cause a bio-chemical oxygen demand, may be reduced in the filter tank D. It is preferred to use crushed limestone rock in this filter, and to sprinkle the effluent upon the bed in the filter. The filter D is shown equipped with a dip-trough 10 which is pivotally mounted at 10ᵃ. The device 10 has two compartments, and will automatically tilt, at intervals, to discharge the contents of one compartment and place the other compartment in position to receive the effluent from the pipe D'.

It was found that a spray rate of about a million gallons of water per acre of filter bed area was very satisfactory, the rock bed being 8 feet deep. In operations in a packing plant on a rather large scale, it was found that the final effluent easily meets the standards set up by board of health bureaus.

It is understood, of course, that the filter is "seeded" with appropriate bacteria for consuming solubles in the water and reducing the bio-chemical oxygen demand of the effluent.

The treatment preceding the filter tank, described above, removes, in a very effective manner, the following kinds of organic matters:
1. Nitrogenous compounds, including:
 (a) Ammonia and its salts.
 (b) Simple and complex proteins.
 (c) Decomposition products of complex proteins, such as peptides and amino-acids.
2. Oils, fats, and waxes, including fatty acids, greases, soaps, and other lipoidal compounds.
3. Other organic materials, such as some disaccharides, some monosaccharides, some pentosans, aldehydes, organic acids, etc.
4. Removal of phosphorus compounds, both inorganic and organic.

The following table may be taken as somewhat typical of results secured by the treatment described, operating the process on a semi-plant basis in a packing plant, and dealing with a concentrated one-third of sewage from such plant.

on the alkaline side of the neutral point. However, where the alkali is to be added in the flocculator B, the best results are attained by using the alkaline range here stated. Mixture of the chemicals with the sewage in the mixer B', with formation of floc, may be accomplished in five or ten minutes. When the floc formation is practically complete, the water is passed into the tank B. After about one-half hour for settling, the clarified effluent is ready to be pumped to the municipal sewage plant for further treatment. Ordinarily, 5 grains of zinc chloride and 10 grains of alum per gallon, plus sufficient fresh lime, say about 40 grains, or less, per gallon of waste water, will produce sufficient purity to make the effluent amenable to treatment in any ordinary sewage treating plant.

As indicated above, the most effective procedure is to use the coagulant in a slightly acid medium, say at about pH 6.2. Also, it is highly desirable to first use the zinc chloride coagulant and, if desired, a coagulant aid, such as alum, in a slightly acid medium and, after separating the coagulum, to add an alkaline reagent to the effluent as a further step. If the coagulant aid (alum, for example) be omitted or reduced substantially such omission or reduction may be compensated for by increasing the main coagulant, i. e. the zinc salt of an inorganic acid such as zinc sulphate.

It is understood, of course, that alum may be used alone, as a coagulant "aid", or other co-

*Continuous run—Parts per million gallons*

| | Total solids | | Suspended mat. | | Forms of N. | | Total Phos. | Av. B.O.D. | Grease |
|---|---|---|---|---|---|---|---|---|---|
| | Vol. | Ash (total) | Vol. | Ash (Susp.) | NH$_3$ | Org. N. | | | |
| Raw, tank A | 11,028 | 2,574 | 1,530 | 210 | 150 | 1,600 | 19.0 | 2,350 | 980.0 |
| Removed from tank A | 57% | 19% | 13% | 33% | 70% | 67% | | 69% | 10% |
| Removed from tank B | 40% | | 50% | | 0.0% | 26% | | 30% | 86% |
| Removed from tank C | 79% | 35% | 93% | 17% | 58% | 78% | | 65% | 99% |
| Total removal from tanks A, B and C | 91% | 47% | 94% | 44% | 88% | 93% | 92% | 93% | 99% |
| Removal at filter | 72% | 36% | 99.7% | 97.5% | 58% | 64% | | 69% | 99.0% |
| Final total removal | 97% | 49% | 99.8% | 98.5% | 85% | 88% | 92% | 90% | 99.2% |

The foregoing result pertains to the treatment of concentrated waste waters while the packing plant was in full operation. Tank B received 10 grains of zinc chloride and 20 grains of commercial alum per gallon of concentrated waste water; and tank C received fresh lime solution at the rate of 40 grains of lime per gallon of waste water, giving a pH of 10.5. Abbreviations in the table are: for volatile matter, Vol.; for ammonium nitrogen, NH$_3$; for organic nitrogen, Org. N.; for nitrogen, N.; for suspended matter, "Suspended mat."; for ash in suspended solids, "Ash (Susp.)"; for phosphorus, Phos.; for bio-chemical oxygen demand, B. O. D.

Where it is desired only to reduce the impurities in heavy sewage sufficiently to make it amenable to treatment in a municipal sewage-treating plant which is not suited to the treatment of heavy sewage, the improved process may be shortened so as to employ only that portion of the apparatus preceding the mixing tank C'. In such case, all chemicals to be used may be introduced through the mixer B'. For example, zinc chloride and alum may be used in proportions of one part zinc chloride to two parts alum; and an alkali may be added in sufficient amount to produce an alkaline medium of pH 8.0 to pH 9.0. Zinc chloride, zinc sulphate or the like will produce a floc formation either on the acid side or agulant aids may be used, either partly or wholly in substitution for alum. When salts of tannic acid are used in addition to a zinc salt and alum, it is best to feed the tannins separately into the flocculator. Generally, it is desired to have the reactions occur when the chemicals are in admixture with the sewage. As is known, where lakes and rivers are contaminated by permitting unpurified sewage to flow therein, not only are the waters liable to become covered with scums and obnoxious surface growths, but also the waters are rendered injurious or destructive to fish life and dangerous to humans, as in the use of bathing beaches. The improved process, if used in its entirety, converts the foulest sewage waters into purified, clarified waters which may pass into lakes and streams without any danger of contaminating the waters therein. The invention, therefore, is one of great practical importance from a sanitary standpoint.

Where pre-chlorinization (in tank A), is employed in connection with highly impure sewage to prevent micro-organisms from decomposing or fermenting the waste waters, it usually suffices to employ about 100 lbs. of chlorine per million gallons of the strong waste waters. The amount of chlorine may vary from 50 lbs. to 1000 lbs. of chlorine per million gallons, depending upon conditions, but it is rarely necessary to use in excess of 100 lbs.

While, in the table showing removal of impurities, removal of 92% of the phosphorus is indicated, it is said that the process often shows as high as 98% removal of total phosphorus. The removal of phosphorus compound is important for the reason that such compounds are plant food stimulants and a fertile source for excessive algae, scums and other obnoxious growths in lakes and rivers.

It will be understood by those skilled in the art that when the impurities in the sewage are reduced, the chemicals used may be reduced. For example, dealing with slaughter house sewage, the impurities are lower when slaughtering is reduced or stopped, for instance at night. At such periods, lesser quantities of chemicals will suffice. Any suitable zinc salt or equivalent may be used in the process.

The foregoing detailed description has been given for clearness of understanding only, and no unnecessary limitations should be understood therefrom, but the appended claims should be construed as broadly as permissible in view of the prior art.

Changes in proportions within limits indicated and the use of equivalent materials are contemplated and are to be understood as within the scope of the invention.

What I regard as new and desire to secure by Letters Patent is:

1. A process for treating fluid sewage which comprises: mixing with the sewage a coagulant comprising a zinc salt of an inorganic acid and effecting coagulation therewith while maintaining in the menstruum a hydrogen-ion concentration less than 7 pH and not below 5 pH; separating the resultant coagulum from the fluid while the fluid remains in acid condition; and subsequently treating said fluid with an alkaline reagent and removing the resultant coagulum from the fluid.

2. A process as set forth in claim 1, as practiced by maintaining in the menstruum containing said zinc salt a hydrogen-ion concentration within about the range of 6.2 to 6.5.

3. A process as set forth in claim 1, in which said zinc salt of an inorganic acid is used within the range of about 3 grains to 15 grains per gallon of sewage.

4. A process as set forth in claim 1, as practiced by employing in the step in which the alkaline reagent is used a pH of about 9.0.

5. A process for treating fluid sewage which comprises: mixing with the sewage a main coagulant comprising a zinc salt of an inorganic acid and an auxiliary coagulant adapted to enhance the formation of floc, said zinc salt being used within the range of about 3 grains to about 15 grains per gallon of sewage, and said auxiliary coagulant being used in larger amount, the menstruum being maintained within a range of less than 7 pH and not less than 5 pH; separating the resultant coagulum from the fluid while the menstruum remains in acid condition; and subsequently treating said fluid with an alkaline reagent and removing the resultant coagulum from the fluid.

6. A process stated in claim 5, as practiced by using alum as said auxiliary coagulant to the extent of about twice the amount of the main coagulant.

7. The process stated in claim 5, as practiced by using alum as the auxiliary coagulant to the extent of about twice the amount of the main coagulant and effecting the resultant coagulation while the menstruum has a hydrogen-ion concentration of about 6.2 to 6.5.

8. A process for treating fluid sewage which comprises: mixing with the sewage a main coagulant comprising a zinc salt of an inorganic acid and an auxiliary coagulant comprising alum, the main coagulant being taken in the proportion of about 10 grains and the auxiliary coagulant being taken in the proportion of about 20 grains per gallon of sewage treated, and the coagulation being effected while the menstruum has a pH below pH 7; separating the resultant coagulum from the fluid while said fluid remains in acid condition; and subsequently mixing with the fluid an alkaline reagent of pH 8.0 or higher and separating from the fluid the resultant coagulum.

9. In a process for treating fluid sewage: mixing with the sewage a coagulant comprising a zinc salt of an inorganic acid, effecting coagulation therewith while maintaining in the menstruum a pH below 7 and not below 5; and separating the resultant coagulum from the liquid while the liquid remains in acid condition.

10. In a process for treating fluid sewage: mixing with the sewage a main coagulant comprising a zinc salt of an inorganic acid and an auxiliary coagulant adapted to enhance the formation of floc, said zinc salt being used within the range of about 3 grains to about 15 grains per gallon of sewage and said auxiliary coagulant being used in larger amount, and effecting coagulation while the menstruum has a pH below 7 and not below 5; and separating the resultant coagulum from the fluid while the fluid remains in acid condition.

11. A process as stated in claim 10, as practiced by using alum as the auxiliary coagulant to the extent of about twice the amount of the main coagulant and effecting the coagulation while the menstruum has a hydrogen-ion concentration of about 6.2 to 6.5.

12. A process of treating fluid sewage which comprises: mixing with the sewage a main coagulant comprising a zinc salt of an inorganic acid and an auxiliary coagulant selected from a group which consists of salts of aluminum, tannic acid and salts thereof, salts of iron, salts of copper, and mineral acids, and effecting coagulation while the menstruum has a hydrogen-ion concentration below pH 7 and not below pH 5; and separating the resultant coagulum from the fluid while the fluid remains in acid condition.

BERNHARD P. DOMOGALLA.